United States Patent [19]

Gavogiannis

[11] 4,321,249

[45] Mar. 23, 1982

[54] PROCESS FOR THE PRODUCTION OF ARTIFICIAL IRON OXIDE

[75] Inventor: Panayotis Gavogiannis, Athens, Greece

[73] Assignee: Chrosticai Sidirou Co., Ltd., Athens, Greece

[21] Appl. No.: 211,385

[22] Filed: Nov. 28, 1980

[30] Foreign Application Priority Data

Nov. 29, 1979 [GR] Greece ................................. 60638

[51] Int. Cl.³ ...................... C01G 49/02; C01F 11/46; C01F 5/40
[52] U.S. Cl. .................................. 423/632; 423/554; 423/555
[58] Field of Search ............... 423/140, 632, 633, 554, 423/555; 106/288 B

[56] References Cited

U.S. PATENT DOCUMENTS

| | | | |
|---|---|---|---|
| 1,269,442 | 6/1918 | Hoffman | 423/632 |
| 2,696,426 | 12/1954 | Marcot | 423/633 |
| 4,137,293 | 1/1979 | Nagata et al. | 423/555 |
| 4,208,393 | 6/1980 | LeBel | 423/555 |

*Primary Examiner*—Earl C. Thomas
*Assistant Examiner*—Margaret B. Medley
*Attorney, Agent, or Firm*—Birch, Stewart, Kolasch & Birch

[57] ABSTRACT

There is disclosed a process for producing yellow iron oxide pigment which comprises the precipitation of the yellow iron oxide pigment by the addition of a soluble metal carbonate in the presence of oxygen to a solution of a soluble ferrous salt wherein the pH of the reaction system is maintained at a value of approximately 4 or less during the precipitation reaction.

5 Claims, 1 Drawing Figure

PROCESS FOR THE PRODUCTION OF ARTIFICIAL IRON OXIDE

DESCRIPTION

BACKGROUND OF THE INVENTION

This invention relates to the production of the commercially useful hydrated iron oxide pigment, which is yellow in color and is known, and will hereinafter be referred to as yellow iron oxide pigment.

Yellow iron oxide pigment has been made by treating a soluble ferrous salt with an alkali metal carbonate or hydroxide, in the presence of oxygen, so as to precipitate the required yellow iron oxide pigment. In practice an overdose of alkali metal carbonate or hydroxide will result in a commercially valueless rust coloured hydrated iron oxide being produced by this process.

DESCRIPTION OF THE INVENTION

We have appreciated that these difficulties in the prior process arise from the fact that the yellow iron oxide pigment is stable, relative to the rust colored oxide, only in an acidic system. Accordingly the present invention is characterized by the step of maintaining the acidity of the reaction system during precipitation, in order to produce the required yellow iron oxide pigment.

The acidic system may be defined as having a pH value of approximately 4 or less. This acidity can be maintained by effecting the precipitation of the yellow iron oxide pigment by the addition of a carbonate which is insoluble at a pH value greater than 4. The reaction is carried out in the presence of oxygen. Thus if the pH of the solution for any reason were to rise above the desired value, the added carbonate would come out of solution thereby effectively stopping the reaction. Preferred carbonates falling into this category are the alkali earth metal carbonates such as magnesium and calcium carbonates. These may be used either separately or as a mixture, for example in the form of the mineral dolomite.

DETAILED DESCRIPTION

Figure 1:
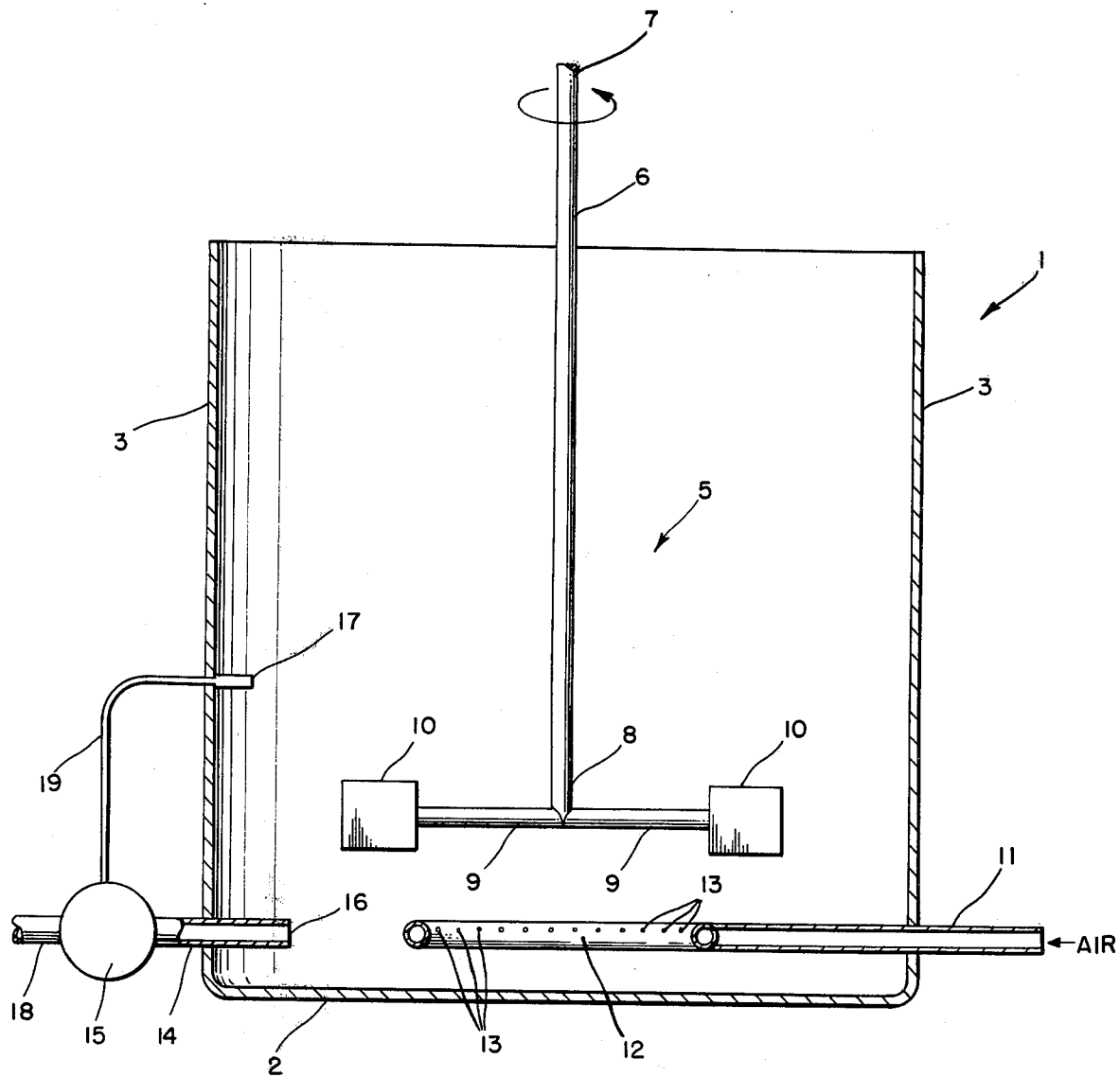

Using ferrous sulphate as an example of a soluble ferrous salt the overall reaction is summarised by the following equation:

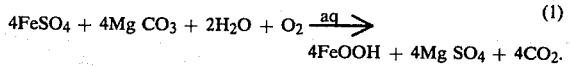

$$4FeSO_4 + 4Mg\,CO_3 + 2H_2O + O_2 \xrightarrow{aq} 4FeOOH + 4Mg\,SO_4 + 4CO_2. \quad (1)$$

This reaction may be a two-step reaction, the first step being a double decomposition reaction, according to equation (2), between ferrous sulphate and magnesium carbonate producing ferrous carbonate and magnesium sulphate, and the second step being a reaction, according to equation (3), between ferrous carbonate, oxygen and water producing carbon dioxide and the required yellow iron oxide pigment.

$$FeSO_4 + Mg\,CO_3 \xrightarrow{aq} FeCO_3 + Mg\,SO_4 \quad (2)$$

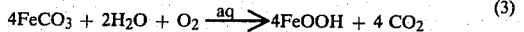

$$4FeCO_3 + 2H_2O + O_2 \xrightarrow{aq} 4FeOOH + 4\,CO_2 \quad (3)$$

The ferrous carbonate produced by the first step, equation (2), is never seen as a precipitate because it immediately reacts according to equation (3) on formation, thus the first reaction is 'driven' by the second reaction removing one of the products of the first reaction from the reaction system.

The process of the present invention should be carried out at a temperature between 10° and 90° C. and preferably the temperature should be between 40° and 70° C.

This invention will now be described by way of example and with reference to the accompanying drawing, which is a sectional view of an apparatus in which the process of the present invention may be carried out.

The apparatus shown comprises a container 1 having a circular base 2 and a cylindrical side wall 3. Agitating means 5 comprises a vertical shaft 6, having at its top end part 7 rotating means (not shown), and extending radially outwards from its lower end part 8 a plurality of horizontal shafts 9 at the ends of which are flat square paddles 10. A tube 11 communicates through side wall 3 between a ring of tubing 12, which lies in a plane parallel and adjacent to the base 2, and a source of air (not shown). The ring of tubing 12 has in its wall a plurality of holes 13. A further tube 14 communicates through the side wall 3, near the base 2 of the container 1, between a thermostatic valve 15 and the open end of the tube 16 inside the container 1. The thermostatic valve is connected to a source of steam (not shown) by a third tube 18, and to thermostat 17 in the side wall 3 by a cable 19.

In use the container 1 is charged with reagents, in accordance with the present invention; the agitating means 5 is set rotating; air is pumped along tube 11 and into the container 1 via the ring of tubing 12 and holes 13; and the thermostat 17 actuates thermostatic valve 15 as required, so as to either allow steam in to heat the reagents up to the required temperature, or to shut off the steam once this temperature has been reached.

PREFERRED EMBODIMENTS

EXAMPLE

The container 1 was charged with a solution of 200 g of ferrous sulphate in 1 dm³ of water, the solution temperature maintained at between 40° and 70° C. To this was added 110 g of magnesium carbonate, the stoichiometrically required quantity of magnesium carbonate for complete reaction according to equation (1)

The reaction mixture was then aerated and agitated until the reaction completed, resulting in a precipitate of the required yellow iron oxide pigment.

An application of the present invention is in the treatment of the waste ferrous chloride solution produced by the steel industry, as a result of acid washing steel with hydrochloric acid. This ferrous chloride solution is traditionally treated with calcium hydroxide, in a large agitator, to form calcium chloride and a cake comprising ferrous and calcium hydroxides, both of which are easily disposed of and are commercially valueless.

If however this waste ferrous chloride is treated with an alkali earth carbonate, in accordance with the present invention, in place of calcium hydroxide, and the agitator modified to allow aeration commercially valuable yellow iron oxide pigment may be produced. Such an application of the present invention would turn a costly waste treatment operation into a profit making operation. The reaction parameters of the above example are applicable to a system based on ferrous chloride.

In another application of the present invention, when ferrous sulphate solution is treated with magnesium carbonate, the magnesium sulphate produced as a by-product is of commercial value as it is used in the production of fertilizers.

The invention being thus described, it will be obvious that the same way be varied in many ways. Such variations are not to be regarded as a departure from the spirit and scope of the invention, and all such modifications as would be obvious to one skilled in the art are intended to be included within the scope of the following claims.

I claim:

1. A process for producing yellow iron oxide pigment which comprises providing an aqueous solution of a water soluble ferrous salt, adding to said aqueous solution a metal carbonate which is insoluble at a pH greater than 4 in an amount equal to the stoichiometrically equivalent of the ferrous salt such that a complete reaction of the respective constituents is realized, said metal carbonate being added to said ferrous salt aqueous solution in the presence of oxygen, wherein the ensuing oxidation reaction takes place in a suspension wherein the pH thereof is maintained at a value of 4 or less, but always such that an acidic condition prevails, such that the entire amount of iron present in said ferrous salt is precipitated as yellow iron oxide pigment in the form of FeOOH.

2. The process of claim 1, wherein said metal carbonate which effects the precipitation of the desired yellow oxide pigment is selected from the group consisting of magnesium carbonate, calcium carbonate, and mixtures thereof.

3. The process of claim 2, wherein said metal carbonate is a mineral dolomite.

4. The process of claim 1, wherein said ferrous salt is selected from at least one member of the group consisting of ferrous sulfate and ferrous chloride.

5. The process as claimed in claims 1, 2, 3 or 4, wherein the oxidation reaction is carried out at a temperature between 10° C. and 90° C., preferably between 40° C. and 70° C.

* * * * *